H. P. KRAFT.
FERRULE MACHINE.
APPLICATION FILED NOV. 30, 1917.
1,322,584.
Patented Nov. 25, 1919.
2 SHEETS—SHEET 1.
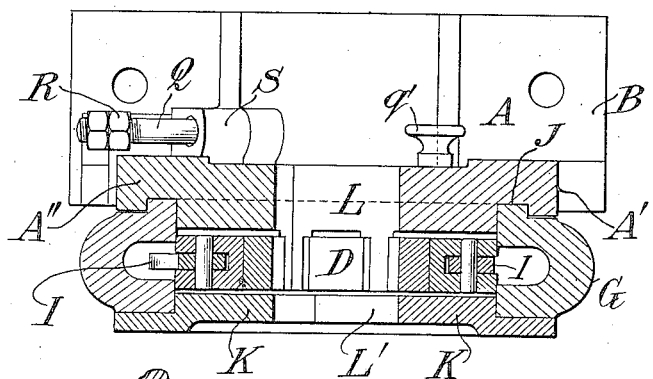
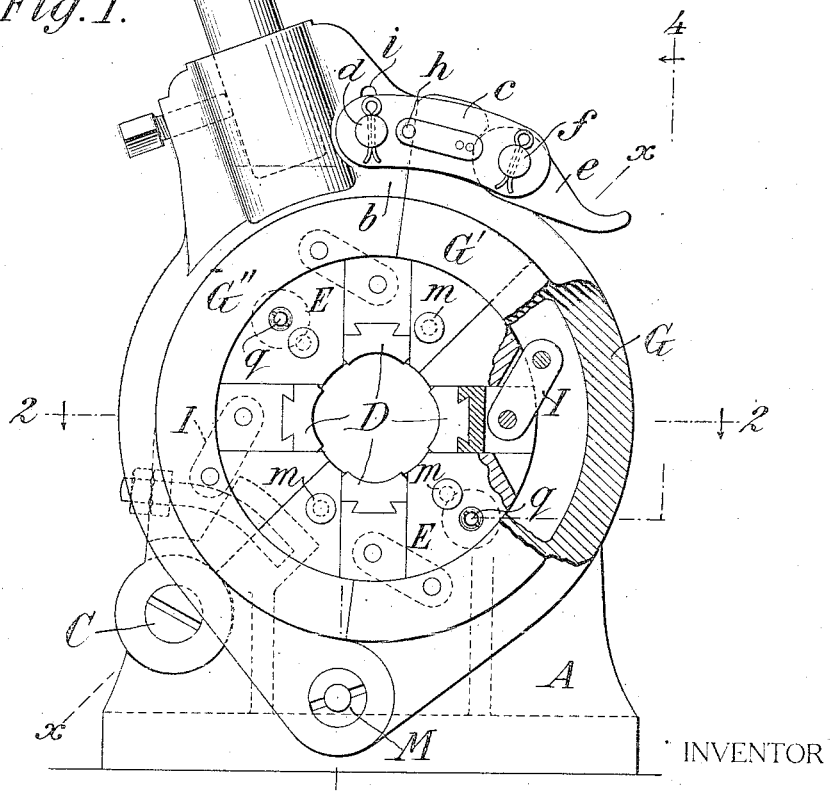
WITNESS:
INVENTOR
Henry P. Kraft,
By Attorneys,

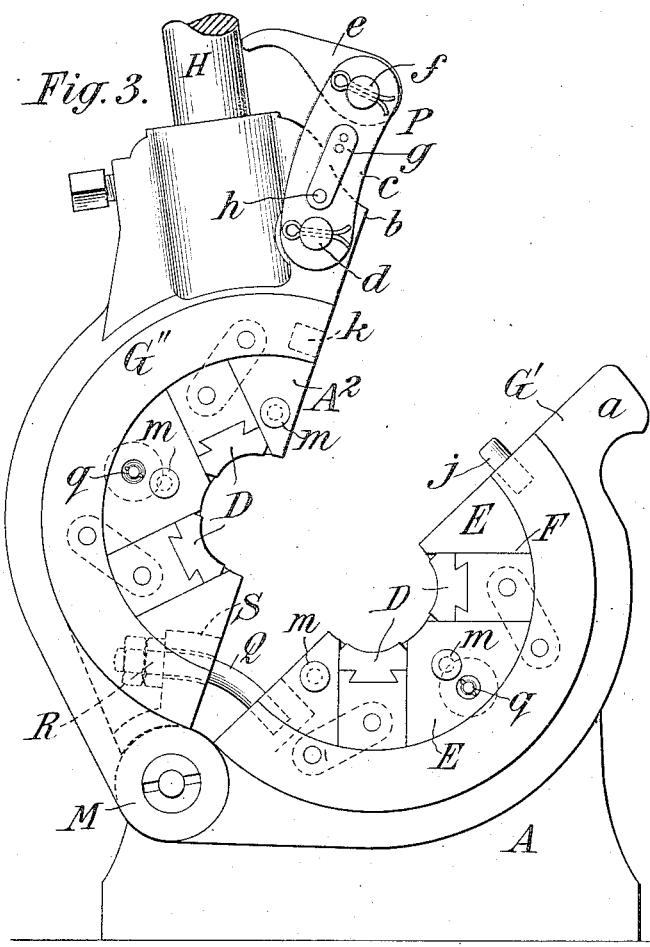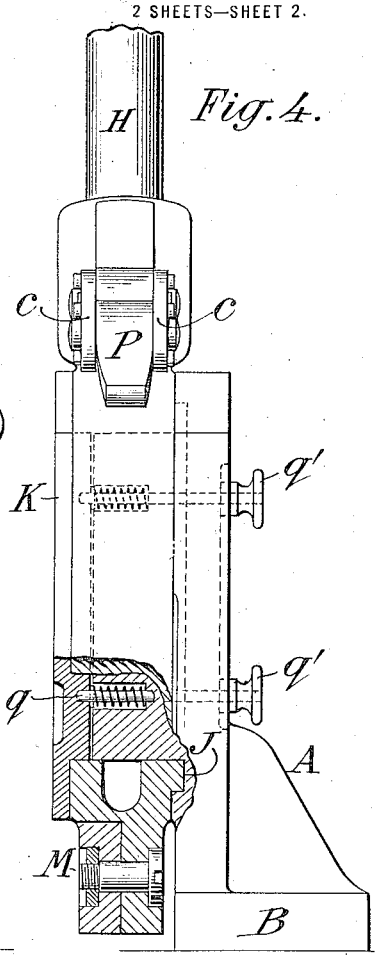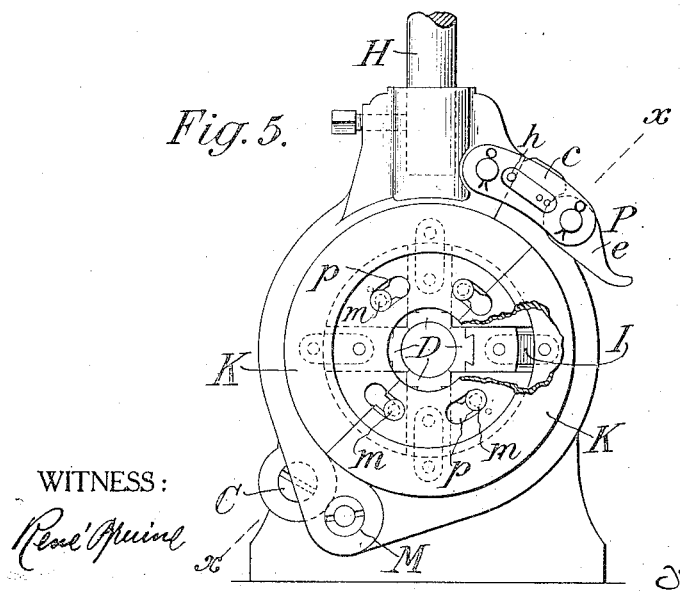

UNITED STATES PATENT OFFICE.

HENRY P. KRAFT, OF RIDGEWOOD, NEW JERSEY.

FERRULE-MACHINE.

1,322,584.

Specification of Letters Patent. Patented Nov. 25, 1919.

Application filed November 30, 1917. Serial No. 204,712.

*To all whom it may concern:*

Be it known that I, HENRY P. KRAFT, a citizen of the United States of America, residing in Ridgewood, in the county of Bergen and State of New Jersey, have invented certain new and useful Improvements in Ferrule-Machines, of which the following is a specification.

This invention relates to a machine for contracting ferrules and the like.

Examples of machines for a like purpose are set forth in patent to G. H. F. Schrader, No. 741,073, of October 13, 1903, and patent to M. C. Schweinert and H. P. Kraft, No. 758,195, of April 26, 1904. The present machine in its main structural features resembles that which is the subject of the last named patent.

Such machines are commonly used for applying a sheet metal ferrule upon the end of a hose or the like by exerting external pressure upon the ferrule so as to contract it tightly upon the hose. So far as concerns the present invention, the operation may be that set forth in said patent, in which the ferrule is simply reduced to a smaller diameter without crimping or corrugating it; or the operation of contracting the ferrule may be performed in any other analogous manner.

A machine of this character comprises a standard which supports the working parts and which is ordinarily stationary, a plurality of jaws or dies movable simultaneously inward to contract the ferrule and movable simultaneously outward to release it, and means for transmitting such simultaneous movements to the jaws. Such means comprise usually an operating handle or lever and intermediate mechanical devices which communicate a vibratory movement of the lever to perform the inward and outward movements of the jaws.

Such machines as heretofore constructed have been well adapted for fastening upon the end of a hose or tube a terminal ferrule, such, for example, as is employed for clamping the hose upon the shank of an inserted coupling, or upon the shell of a valve or the like, when the object so to be fastened on is not seriously larger than the hose. In operation, the end of the hose with the loosely applied ferrule and the coupling union or other device is inserted into a central aperture in the machine and the handle moved to perform the contracting operation, whereupon the end of the hose is pulled back through the opening to remove it from the machine. But in some cases the object applied to the end of the hose is too large to permit of drawing it back through the opening, and in such cases it has sometimes been found necessary to move the hose in the contrary direction so as to pull the entire length of the hose through the opening of the machine. The present invention provides a construction which obviates this disadvantage.

According to the present invention the ferrule machine is so divided that it may be opened out to permit the hose and its attached parts to be removed laterally instead of longitudinally. To this end the stationary standard is constructed in two parts, preferably hinged together, and the operative parts carried by the standard are so constructed as to permit of the opening movement of the standard.

The accompanying drawings show the preferred embodiment of the invention.

Figure 1 is an elevation partly broken away in section, showing the machine closed together and ready for performing the ferruling operation.

Fig. 2 is a horizontal section on the line 2—2 in Fig. 1.

Fig. 3 is an elevation showing the machine opened out for the lateral removal of the work.

Fig. 4 is a side elevation partly in vertical section on the line 4—4 in Fig. 1.

Fig. 5 is a side elevation on a smaller scale showing the machine in the position which it occupies when the jaws are closed together for contracting the ferrule, this view being partly broken away to better show the internal construction.

The preferred construction of the machine illustrated in the drawings will now be described, it being understood that the invention is not limited to this precise mechanical embodiment.

Referring to the drawings, A is the stationary standard of the machine, which is formed in two parts, A' and A", the former having a base flange B, by which it may be fastened down to a bench or platform, and the latter A" being movable in the act of opening the machine. The two parts are preferably hinged together at C. The standard A is suitably constructed to serve as a support and guide for the working parts of the machine. These parts comprise jaws D—D and the parts which give movement to the jaws. For supporting and guiding the jaws the standard A is formed with segmental projections E—E, having between them guideways F—F in which the jaws may slide radially inward and outward. For imparting movement to the jaws, the most convenient mechanism is that shown in said Patent No. 758,195, and consists of a movable ring G, encircling the series of jaws and surrounding the projections E—E, and which has applied to it a handle H for imparting to it limited rotary movements. These movements are communicated to the jaws by means of toggle links I—I, each pivoted at one end to the ring and at the other end to one of the jaws. As the ring is turned the links are straightened until they assume radial positions, as shown in Fig. 5, whereby the jaws are closed together; and as the movement is continued past this point the links assume oblique positions and pull the jaws outward. The ring is guided by having a concentric flange entering an annular groove J in the standard A, and is held in place by means of a flanged front plate K. This front plate K is removed in Figs. 1 and 3 to better show the jaws and segments E; it is shown in position in Figs. 2, 4 and 5.

The standard A has a central opening L and the plate K has a similar opening L'. The end of the hose with its loosely applied ferrule is inserted through these openings with the ferrule in the plane of the jaws, D, and the lever H is then thrown over from the position shown in Fig. 1 to that shown in Fig. 5 and preferably the movement is continued to an equal extent beyond this position, thereby first closing the jaws together and then reopening them, so that in the single movement the ferrule is contracted and then released so that the hose can be withdrawn.

So far as described, except for the subdivision of the standard A, the construction is substantially like that shown in Patent 758,195.

In order to permit the opening of the machine in the manner shown in Fig. 3, the entire machine is subdivided so that in one position it may be thrown open, thereby leaving a wide gap through which the work may be removed; to accomplish this it is necessary to divide the standard A, and also in the particular construction of the machine illustrated, to similarly divide the movable ring G. It is preferable to hinge the respective halves of these elements together. The hinge for uniting the parts A', A'', of the standard is shown at C; and a similar hinge for the two halves G', G'' of the ring G is shown at M. Before opening the machine, it is practically necessary to move the ring G into such position as to bring the hinge M into axial coincidence with the hinge C, so that in the opening movement the respective parts may turn as upon a single hinge axis. The division of the standard A is upon a diametrical line $x$—$x$, which intersects two opposite projections E—E, the result being that two of the jaws D are carried by the stationary or immovable half A' of the standard and the other two jaws are carried by the movable half A'' thereof. To prevent accidental opening of the respective halves of the standard and of the ring G, in use, it is necessary to provide some means for locking them together. For this purpose a locking device is applied to unite the halves of the ring G and since this ring embraces a portion of the standard, the locking of the ring closed in turn holds the standard closed together. A convenient form of lock for the ring is that shown, consisting of a link and cam device carried by one half of the ring and engaging the other half. The half ring or segment G' is formed with a lug, $a$, and the half ring G'' has a projection, $b$, to which latter the locking device P is attached. This locking device comprises a pair of links, $c$—$c$, pivoted to the lug $b$ by a pin $d$ and carrying at their opposite ends a cam lever $e$ pivoted to the links by a pin $f$. The pivotal portion of the lever $e$ is eccentric or cam-shaped so that as the tail of the lever is turned down to the position shown in Fig. 1, this cam portion, engaging the lug $a$, takes up any slack and brings the respective parts into close and tight engagement. To unlock the parts it is only necessary to throw up the tail of the lever $e$ and then swing back the lever and links to the position shown in Fig. 3. To prevent their falling back and accidentally relocking the parts or getting in the way, it is desirable to provide a friction device for holding the links in the position shown in Fig. 3. This device as shown consists of a leaf spring $g$, one end of which is riveted or otherwise secured to the outer face of the link and the other, or free end, is connected to a pin $h$, which passes through a hole in the link and bears at its end against the face of the lug $b$, which face has a hollow or indentation $i$, which is entered by the rounded end of the pin when the links are in the position shown in Fig. 3. The spring latch $g$ may advantageously be duplicated on opposite sides of the respective links.

It is practically necessary to limit the opening movement, and for this purpose it is well to provide a stop which, as shown, consists of a pin Q, one end of which is cast or otherwise fixedly secured in the part A' of the standard, and the other end of which is screw-threaded to receive nuts R, which, being locked together, serve as a stop and receive the abutment of some part of the segment A", such part, in the construction shown, being a projecting lug S formed integrally therewith. Any other convenient construction of stop device may be substituted.

To guide the parts as they come together and hold them in position and thereby relieve the hinge C from strain, the respective halves of the standard are provided the one with a pin or dowel $j$, the other with a socket $k$ closely fitting such pin.

When the flanged front plate K is used as the means for holding the ring G in place it is necessary also to subdivide such plate K in the same plane $x$ as the standard. The respective halves of the plate K are fastened in any suitable way to the respective halves of the standard. Any suitable fastening may be provided for this purpose; but preferably a form of fastening should be used which will permit the quick and easy removal of the halves of the plate K, in order to get access to the ferruling jaws D. This is particularly desirable in order that the working faces of these jaws, which are dovetailed to the bodies thereof, may be removed and replaced by others for adapting the machine to operating with larger or smaller ferrules. For this purpose it is desirable to adopt the same expedient as in said Patent No. 758,195; namely: to form the plate K with arc-shaped slots which are entered by headed screws or studs so that in the normal position of the plate it is firmly held, but by turning it slightly the heads of the screws or studs are brought into coincidence with enlarged portions of the slots, which permit the removal of the plate. Instead of screws it is preferable to employ immovable studs, shown at $m$—$m$. The arc-shaped slots $p$—$p$ are clearly shown in Fig. 5, where the parts are in their normal or locked position. To release the plate K it is turned bodily to bring the open or larger ends of the slots $p$ into coincidence with the studs, whereupon the plate may be removed. To prevent accidental displacement of the plate to this position and hold it securely in the normal locked position shown in Fig. 5, spring bolts are provided, one for each half of the plate, which engage the plate in its normal locked position and hold it against turning until the bolts are withdrawn. These bolts are shown at $q$—$q$, each consisting, in the construction shown, of a rod pressed forward by a spring and having on its rear end a knob $q'$, which may be grasped to pull back and release the bolt. The sectional portion of Fig. 4 shows how the front end of the bolt enters a recess in the plate K to lock the latter against turning.

In operation, the machine is ordinarily locked in the closed position, as shown in Figs. 1 and 5, and for ordinary ferruling work it is kept thus locked, the hose being simply introduced through the opening L' to have the ferrule clamped on and then withdrawn through the same opening. But for work which cannot be so withdrawn the ferruling operation is performed and then the machine is unlocked and thrown open, as shown in Fig. 3, for enabling the work to be removed sidewise. In the case of work which cannot even be entered axially, the machine may be thus opened before the introduction of the work, so that it is both put in and taken out laterally while the machine is open.

For ordinary use it is desirable that the hand lever H have a stroke to both sides of the central position shown in Fig. 5 so that the ferruling is completed in a single movement from one extreme of the stroke to the other, as fully explained in Patent No. 758,195. But this is not essential to the present invention; and in the case of work which requires the opening of the machine after each ferruling movement a double stroke of the operating lever is necessary for each operation, in order to bring the machine back to the only position in which the opening can be performed; namely: with the plane of sub-division of the ring G in coincidence with the plane $x$—$x$ on which the standard is subdivided. For such use it is sufficient to move the lever H from the starting point to the mid-position shown in Fig. 5 and back again.

While the construction shown and described is the preferable one, it is to be understood that the present invention is not limited thereto. Instead of basing it upon the construction shown in the Patent No. 758,195, any other known and convenient construction of the ferruling elements of the machine may be adopted as the basis for the present invention, within the scope of the following claims.

I claim as my invention:—

1. A ferrule machine comprising a standard, and means supported thereby for contracting a ferrule, characterized in that the standard and contracting means are formed in two parts adapted to be separated to open the machine and permit the lateral removal of work therefrom.

2. A ferrule machine according to claim 1, further characterized in that the respective parts of the machine are hinged together.

3. A ferrule machine according to claim 1, further characterized in that the respective parts of the machine are provided with locking means for holding them united when in operative position.

4. A ferrule machine comprising a standard, having an opening for admitting work, ferrule contracting jaws supported thereby, and surrounding said opening, and means for simultaneously moving said jaws inward and outward, characterized in that said standard is formed in two parts adapted to be separated to open the machine and permit the lateral removal of work therefrom, and said jaws are mounted on said respective parts of the standard.

5. A ferrule machine according to claim 4, further characterized in that the respective parts of the standard are hinged together and locking means are provided for holding the machine closed in operative position.

6. A ferrule machine comprising a standard, jaws carried thereby, and means for operating said jaws comprising a rotative ring, characterized in that said standard and ring are divided into two parts hinged respectively together, the respective hinges coinciding in one rotary position of the ring so that in said position the machine may be opened, and means for holding the respective parts in closed position.

7. A ferrule machine according to claim 6 further characterized in that the ring alone is provided with locking means for holding it closed, and so engaging the standard as to prevent the opening of the latter when the ring is locked.

8. In a ferrule machine comprising a rotative ring formed in two parts, hinged together, the combination therewith of locking means comprising links, and a cam lever connected to one part of the ring and engaging a lug on the other part thereof.

9. A ferrule machine according to claim 8 wherein the locking means for the ring is provided with a device for holding it in unlocked position.

10. In a ferrule machine according to claims 8 and 9, a holding device for the lock consisting of a spring pressed pin engaging a depression in the unlocked position.

11. A ferrule machine comprising a standard, ferrule contracting jaws carried thereby, means for operating said jaws comprising a ring having a limited rotary movement, and a flanged plate for holding said ring in place against the standard, said plate having fastening means engaging the standard by a turning movement of the plate, and a catch device engaging the plate in its normal operative position to hold it against such turning movement.

In witness whereof I have hereunto signed my name.

HENRY P. KRAFT.